J. HIST.
DROPPING DEVICE FOR POTATO PLANTERS.
APPLICATION FILED AUG. 17, 1920.
1,431,659.
Patented Oct. 10, 19.
2 SHEETS—SHEET 1.
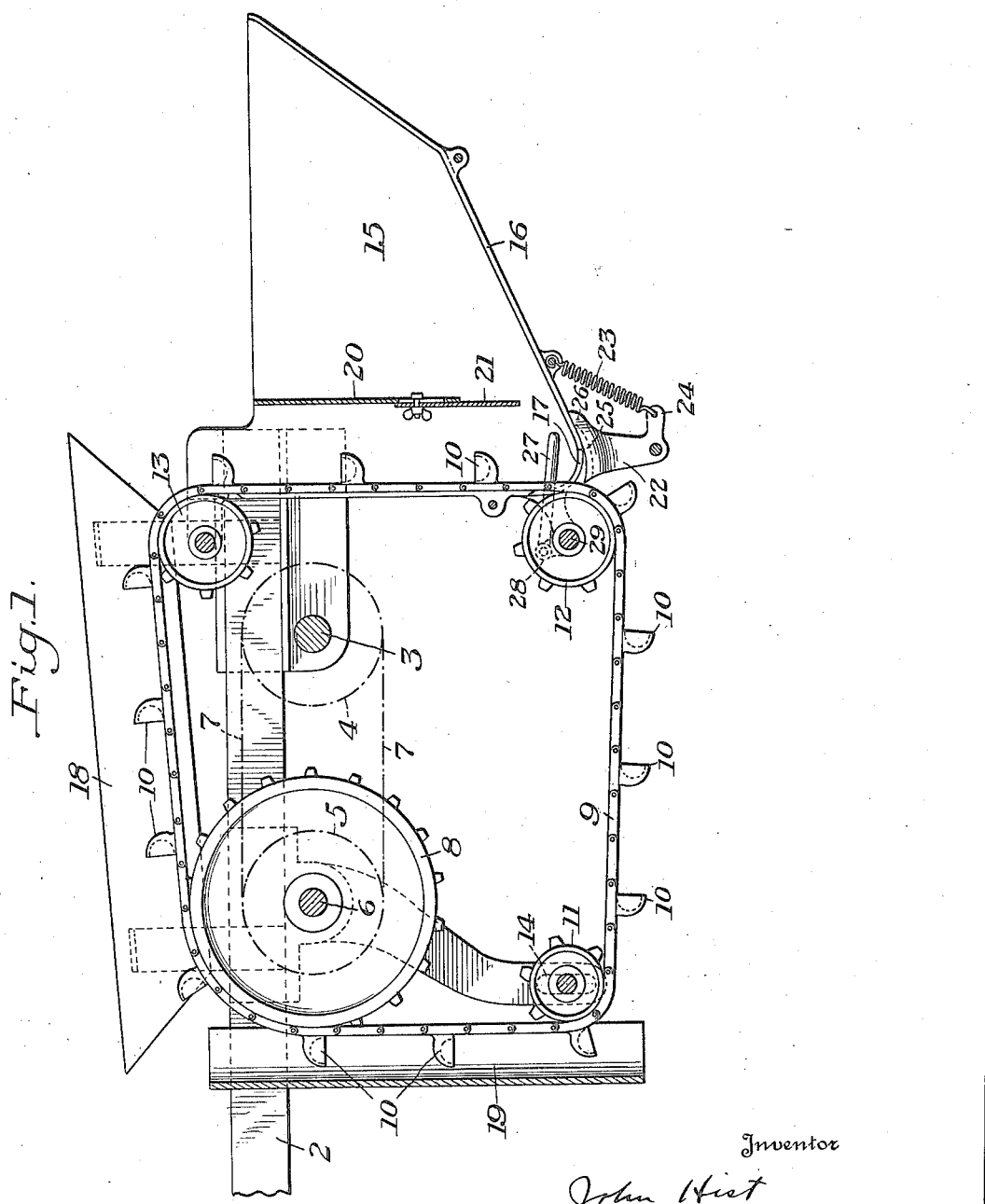

J. HIST.
DROPPING DEVICE FOR POTATO PLANTERS.
APPLICATION FILED AUG. 17, 1920.
1,431,659.
Patented Oct. 10, 1922.
2 SHEETS—SHEET 2.
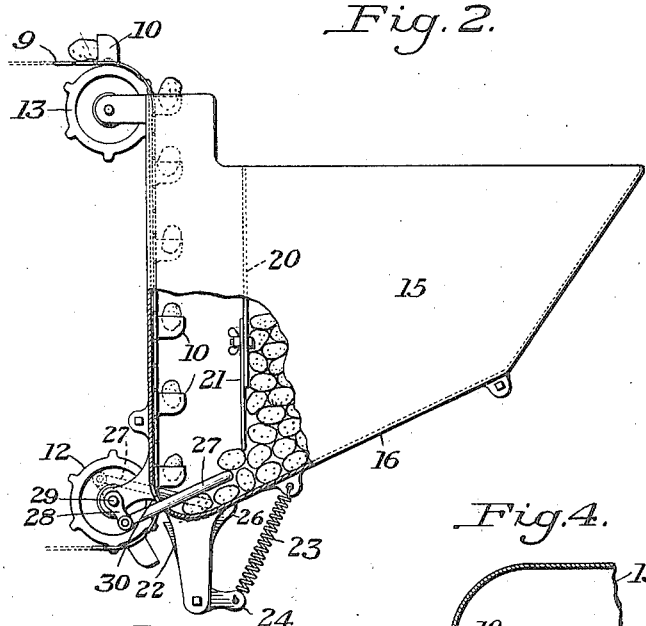
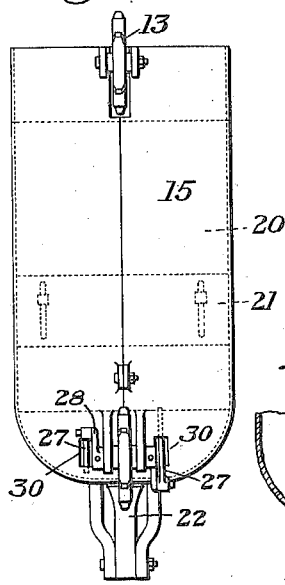
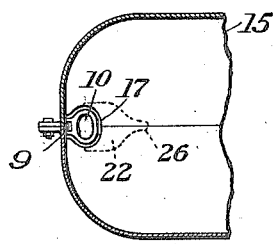
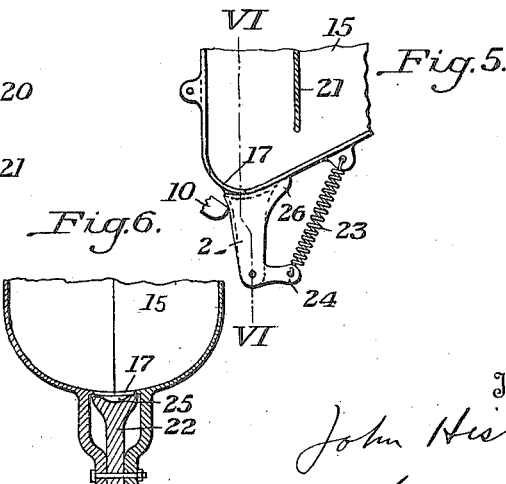
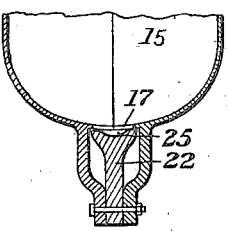
Inventor
John Hist
by
Bakewell, Byrnes & Parmelee
his Attorneys Patented Oct. 10, 1922.

1,431,659

UNITED STATES PATENT OFFICE.

JOHN HIST, OF ALLIANCE, OHIO, ASSIGNOR TO THE CLEVELAND IMPLEMENT MANUFACTURING COMPANY, OF ALLIANCE, OHIO, A CORPORATION OF OHIO.

DROPPING DEVICE FOR POTATO PLANTERS.

Application filed August 17, 1920. Serial No. 404,067.

*To all whom it may concern:*

Be it known that I, JOHN HIST, residing at Alliance, in the county of Stark and State of Ohio, have invented a new and useful Improvement in Dropping Devices for Potato Planters, of which the following is a full, clear, and exact description, reference being had to the accompanying drawings, forming part of this specification.

The present invention relates broadly to planters, and more particularly to dropping devices for potato planters, although its use in this particular is not a limited one.

The principal object of the present invention is to provide a planter having means for positively insuring the feed of the seed to dropping mechanism. Another object of the invention is to prevent the seed potato in the feed hopper from becoming banked and clogging the machine.

The foregoing and other objects, together with their attendant advantages, will be apparent as the invention becomes better understood, by reference to the accompanying specification and drawings, it being premised that changes may be made in the various details and the manner of operation, within the scope of the appended claims, without departing from the spirit of the invention.

In the drawings:

Figure 1 is a side elevation partly in section of a portion of a potato planter;

Figure 2 is a detail view partly broken away of the feed hopper;

Figure 3 is an end view of the hopper;

Figure 4 is a detail cross sectional view of a portion of the hopper illustrating the bottom.

Figure 5 is a detail vertical sectional view of a portion of the hopper; and

Figure 6 is a sectional view on the line VI—VI of Figure 5.

In my Patent No. 1,035,191, of August 13, 1912, I have illustrated a potato-planting mechanism of the type with which the present invention is adapted to be utilized, although the present device is also adaptable for use with other types of planters. With planters of the type illustrated in said patent, as well as with other makes, it has been necessary at times to manually supply potatoes to certain of the buckets which failed to automatically take seed from the hopper. By the use of the present invention, such manual attention is rendered unnecessary.

Referring more particularly to the drawings there is illustrated generally a portion of a suitable framework 2, adapted to be supported on an axle 3, which carries the usual wheels, not shown herein. Mounted on the axle 3 is a sprocket wheel 4, for driving a similar sprocket wheel 5 splined to a shaft 6, extending transversely of the frame 2, the drive being effected through a suitable chain 7.

The shaft 6 also carries a second sprocket wheel 8, for driving a conveyer chain 9, provided with a plurality of buckets 10, the number of which may be varied in accordance with the rapidity with which it is desired to plant. The conveyer chain is guided during its travel by suitably mounted sprockets 11, 12 and 13, preferably forming a substantially rectangular course of travel therefor. If desired, one of these sprockets may have an adjustable mounting 14 to maintain the desired tension on the conveyer chain.

Connected to the rear end of the frame is a hopper 15, preferably formed with a downwardly and forwardly inclined bottom 16, causing the potatoes therein to gravitate to a position in the proximity of the opening 17 through which the conveyer chain buckets 10 are adapted to pass. If a potato is in proper position adjacent the opening 17, it will be lifted by a bucket 10 and carried upwardly around the sprocket 13, and thence forwardly through a horizontally extending trough-shaped guide 18, to a vertically extending guide 19, from which they will be delivered as required for planting.

In order to prevent clogging of the apparatus, due to banking or piling of the potatoes in the hopper 15, I preferably provide a vertical partition 20, having a lower portion 21 vertically adjustable in accordance with the size of seed being planted. The opening 17 is automatically closed after the passage of each of the buckets 10 therethrough by a pivoted gate 22, drawn forwardly by a spring 23, secured between the hopper and the projection 24 on the gate. The upper surface of the gate may be provided with a concavity or pocket 25, adapted to receive a potato and properly position it, and also with a projection 26, engaging the bottom of the hopper and limiting the forward movement of the gate under the influence of spring 23. It will be apparent that each of the buckets 10 will engage the gate 22, as clearly shown in Figure 5, and move the same against the action of the spring 23.

I have found in actual practice that while a machine having only the features thus far described is commercially successful, the efficiency may be greatly increased by the addition of supplemental means for agitating or disturbing the mass of potatoes in the hopper for insuring the feeding or positioning of the potatoes above the opening 17 as rapidly as they are removed by the buckets 10. This means as illustrated herein preferably comprises a pair of fingers or stirrers 27, each secured to a crank 28, formed, one on each side of the sprocket wheel 12, in the shaft 29 carrying the wheel and splined thereto. These fingers extend forwardly through openings 30 in the front end of the hopper 15, and as the shaft 29 is rotated by the travel of the conveyer chain over the wheel 12, continually exert a gentle stirring and poking action on the potatoes, effectively preventing clogging and increasing the percentage of efficiency of feed of the machine. Due to the provision of comparatively large openings 30, it will be apparent that the fingers do not have to travel in a predetermined orbit, but may change throughout the succeeding cycles of rotation, if required, to prevent injuring the potatoes.

The advantages of the present invention arise from the provision of means for positively insuring the feed of potatoes to the conveyer buckets or dropping mechanism.

I claim:

1. In a potato planter, a dropping mechanism, a feed hopper, and movable means extending into the hopper and co-operating with the dropping mechanism for feeding potatoes thereto, the manner of movement of said means being automatically changed by the potatoes in said hopper, substantially as described.

2. In a potato planter, a conveyer having a series of dropping buckets thereon, a hopper through which said buckets pass, and movable means extending into said hopper for insuring the feed of a potato to each of said buckets, the manner of movement of said means being automatically changed by the potatoes in said hopper, substantially as described.

3. In a potato planter, a conveyor having a series of dropping buckets thereon, a hopper through which said buckets pass, and an agitating finger extending into said hopper for insuring the feed of a potato to each of said buckets, the manner of movement of said finger being automatically changed by the potatoes in said hopper, substantially as described.

4. In a potato planter, a conveyor having a series of buckets thereon, a hopper through which said buckets pass, said hopper having a bottom opening therein for the admission of said buckets, a spring gate adapted to normally close said opening and having a pocket to receive a potato to properly position the same for each of said buckets, and means for insuring the feed of potatoes to said gate, substantially as described.

5. In a potato planter, a conveyor having a series of buckets thereon, a hopper through which said buckets pass, said hopper having a bottom opening therein for the admission of said buckets, a spring gate adapted to normally close said opening and having a pocket to receive a potato to properly position the same for each of said buckets, agitating fingers extending into said hopper for insuring the feed of potatoes to said spring gate, substantially as described.

6. A dropping mechanism for potato planters, comprising a conveyer chain, a series of buckets thereon, a hopper for supplying potatoes to said bucket, and a plurality of fingers extending into said hopper for agitating the potatoes therein, said fingers having changeable orbits of travel determined by the position of the potatoes in said hopper, substantially as described.

7. A dropping mechanism for potato planters, comprising a conveyer, a series of buckets thereon, means for driving said conveyer, a sprocket driven by said conveyer, a hopper for supplying potatoes to said conveyer, and means operated by said sprocket for agitating the potatoes in said hopper, the operation of said means being automatically changeable to accomodate different arrangements of potatoes in said hopper, substantially as described.

8. A dropping mechanism for potato planters, comprising a conveyer, a series of buckets thereon, means for driving said conveyer, a sprocket driven by said conveyer, a hopper for supplying potatoes to said conveyer, and a loosely pivoted agitating finger operated by said sprocket and having a changeable orbit of travel for agitating the potatoes in said hopper, substantially as described.

9. A dropping mechanism for potato planters, comprising a conveyer, a series of buckets thereon, means for driving said conveyer, a sprocket driven by said conveyer, a hopper for supplying potatoes to said conveyer, and a plurality of loosely pivoted oppositely moving agitating fingers operated by said sprocket and having changeable orbits of travel for agitating the potatoes in said hopper, substantially as described.

10. A dropping mechanism for potato planters, comprising a conveyer chain, a series of buckets thereon, a hopper for supplying potatoes to said bucket, a plurality of fingers extending into said hopper for agitating the potatoes therein, and means for giving a combined reciprocatory and oscillatory movement to said fingers, the movement of said fingers being varied by the potatoes in said hopper, substantially as described.

11. A dropping mechanism for potato planters, comprising a conveyer chain, a series of buckets thereon, a hopper for supplying potatoes to said bucket, and a plurality of loosely pivoted fingers extending into said hopper and movable in changing orbits for agitating and positioning the potatoes therein, substantially as described.

In testimony whereof, I have hereunto set my hand.

JOHN HIST.